United States Patent [19]
Russell

[11] Patent Number: 5,239,489
[45] Date of Patent: Aug. 24, 1993

[54] PEN POSITION AND TILT ESTIMATORS FOR A DIGITIZER TABLET

[75] Inventor: Gregory F. Russell, Yorktown Heights, N.Y.

[73] Assignee: International Business Machines Corporation, Armonk, N.Y.

[21] Appl. No.: 696,483

[22] Filed: May 6, 1991

[51] Int. Cl.$^5$ .................................... G06F 15/20
[52] U.S. Cl. .................................. 364/560; 178/18; 178/19
[58] Field of Search .................. 178/18, 19; 364/556, 364/560, 705.03

[56] References Cited

U.S. PATENT DOCUMENTS

| | | | |
|---|---|---|---|
| 3,873,770 | 3/1975 | Ioannou | 178/18 |
| 3,904,822 | 9/1975 | Kamm et al. | 178/19 |
| 4,029,899 | 6/1977 | Gordon | 178/19 |
| 4,088,842 | 5/1978 | Ikedo | 178/19 |
| 4,185,165 | 1/1980 | Fencl | 178/19 |
| 4,255,617 | 3/1981 | Carau, Sr. et al. | 178/19 |
| 4,260,852 | 4/1981 | Fencl | 178/19 |
| 4,477,877 | 10/1984 | Nakamura et al. | 178/18 X |
| 4,492,819 | 1/1985 | Rodgers et al. | 178/18 |
| 4,552,991 | 11/1985 | Hulls | 178/18 |
| 4,577,057 | 3/1986 | Blesser | 178/18 |
| 4,644,102 | 2/1987 | Blesser et al. | 178/19 |
| 4,661,656 | 4/1987 | Rodgers et al. | 178/18 |
| 4,672,155 | 6/1987 | Naruse | 178/19 |
| 4,691,200 | 9/1987 | Stephany | 340/784 |
| 4,717,793 | 1/1988 | Kobayashi | 178/18 |
| 4,736,073 | 4/1988 | Abernethy | 178/19 |
| 4,740,660 | 4/1988 | Kimura | 178/19 |
| 4,818,826 | 4/1989 | Kimura | 178/19 |
| 4,818,851 | 4/1989 | Kimura | 178/19 X |
| 4,859,814 | 8/1989 | Sciacero et al. | 178/19 |
| 4,896,002 | 1/1990 | Papsin | 178/18 |
| 4,922,618 | 5/1990 | Osborn et al. | 33/1 MP |
| 4,928,256 | 5/1990 | Parnell et al. | 178/19 X |
| 4,939,318 | 7/1990 | Watson et al. | 178/19 |
| 4,956,526 | 9/1990 | Murakami et al. | 178/18 |
| 4,987,411 | 1/1991 | Ishigami | 340/709 |
| 4,988,837 | 1/1991 | Murakami et al. | 178/18 |
| 4,990,726 | 2/1991 | Lasley | 178/19 |
| 4,996,393 | 2/1991 | Zalenski et al. | 178/19 |
| 5,136,125 | 8/1992 | Russell | 178/19 |

FOREIGN PATENT DOCUMENTS

| | | |
|---|---|---|
| 0199910 | 2/1986 | European Pat. Off. |
| 53-90815 | 8/1978 | Japan |
| 0112414A1 | 7/1984 | United Kingdom |

Primary Examiner—Edward R. Cosimano
Attorney, Agent, or Firm—Perman & Green

[57] ABSTRACT

A digitizer tablet (10) has an array of conductors that define a sensing plane (12) for sensing an electromagnetic signal generated by a pointing device (16) disposed external to the plane. The tablet includes circuitry, coupled to the array of conductors, for determining a magnitude of an electrical signal or signals induced within the array of conductors by the pointing device. The tablet also includes a data processor (30) that is responsive to the determined magnitude for accurately estimating both a position and an angular orientation of the pointing device relative to a coordinate system associated with the sensing plane. A first position estimate derived from a zero-crossing estimator is used to position a weighting function, which is employed in a weighted least squares fit of a line to the data, resulting in a second zero-crossing estimate of the position of the pointing device. On this second position estimate another weighting function is centered and a tilt estimation is obtained. The tilt estimation is employed to derive a correction for the position estimate.

17 Claims, 7 Drawing Sheets

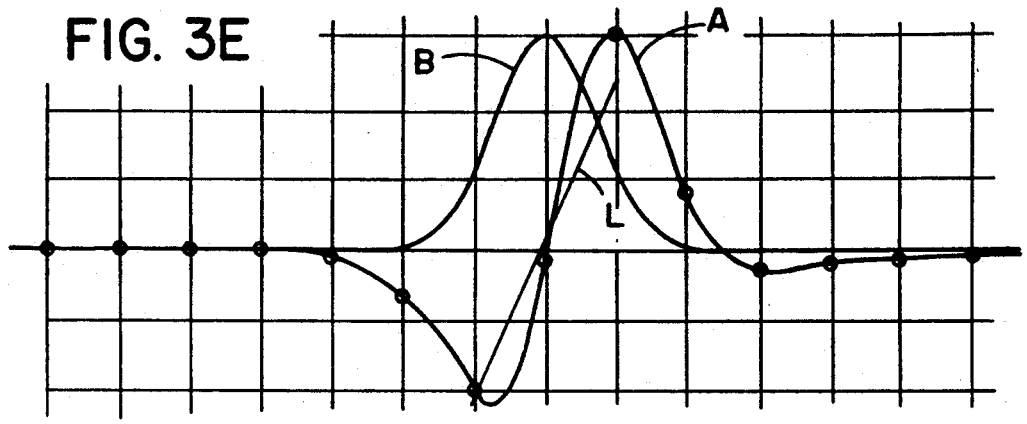
FIG. 3E
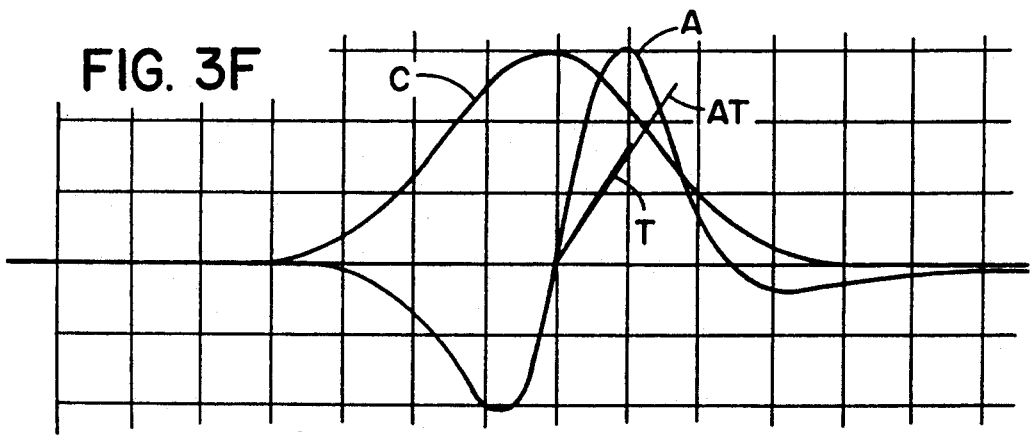
FIG. 3F
FIG. 3A
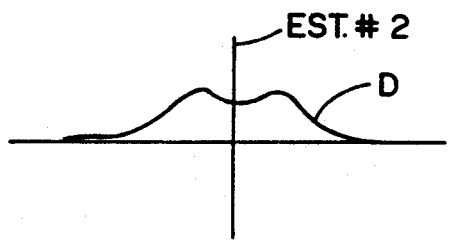

IN PHASE

OUT OF PHASE

PEN POSITION AND TILT ESTIMATORS FOR A DIGITIZER TABLET

FIELD OF THE INVENTION

This invention relates generally to electromagnetic (EM) digitizing apparatus and methods and, in particular, to inductive pen position and tilt estimators.

BACKGROUND OF THE INVENTION

A number of types of EM digitizers or digitizer tablets are known in the art. In general, a digitizer tablet provides an indication of a position of a probe with respect to a surface of a planar sensor grid. One type of digitizer tablet operates by sensing a magnetic field and includes two sets of array conductors, with one set being orthogonally oriented to the other set. In this type of system the probe is driven with an AC signal to cause an oscillating magnetic field which induces signals in the array conductors. The signals in the array conductors are sensed and compared so as to determine the position of the probe in two dimensions, relative to the surface of the tablet.

Other types of digitizer tablets are also known, such as tablets that drive the array conductors and sense the field with the probe. Tablets that operate with electric fields and resistive bridges are also known. Tablets that include magnetostrictive elements are also well represented in the prior art.

The magnetic field sensing tablet is of particular interest herein. More specifically, this type of tablet measures a mutual inductance of a pair of coils. One of the pair of coils is located within the tablet and the other coil is located within the probe, also referred to herein as a stylus or pen. The pen may be physically coupled to the tablet through one or more wires, referred to as a "tethered" pen, or may be physically decoupled from the tablet as an "untethered" pen. The untethered pen embodiment is preferred in that a more natural user interface is provided.

Many tablet sensor grid arrangements consist of sets of identical, elongated coils arranged along the tablet x-axis and y-axis. One conventional method of estimating pen position is to measure the signal strengths in the coils near the pen and to estimate the location of a peak signal strength along each dimension. This is equivalent to finding a zero-crossing of the signal derivative in each dimension. Since all calculations are performed on the derivative, it is convenient to refer to measurements of the derivative. These measurements are conventionally obtained by taking the differences of signals in adjacent coils from the coil array.

A problem associated with conventional digitizer tablets is in accurately predicting pen position from the signals recovered from the sensor coils. In this regard it is known that pen tilt, or orientation with respect to a normal to the surface of the tablet, influences a zero crossing estimate of the coil signals and, hence, an estimate of pen position. Aside from the effect of tilt on the position estimate, the pen tilt information itself, in conjunction with x-y positional information, may be of considerable value to some users of digitizer tablets, such as automatic on-line handwriting recognition systems.

The following chronologically ordered U.S. patents are representative of a significant number of U.S. patents that have been issued in this technical area.

In U.S. Pat. No. 3,904,822, issued Sep. 9, 1975, entitled "Absolute Position Determining System Using Free Stylus" to Kamm et al. there is described orthogonal conductor grids that are energized with time spaced current pulses. A discussion of stylus tilt is provided in reference to FIG. 4 and circuitry is disclosed for generating an output signal and an estimated zero-crossing time.

In U.S. Pat. No. 4,185,165, issued Jan. 22, 1980, entitled "Low Noise System and Method for Sequentially Sensing Induced Signals in Digitizer Grid Conductors" to Fencl there is described a high signal-to-noise ratio digitizing system having a pen with a coil disposed around a nose piece. A grid of conductors includes a group of parallel spaced conductors oriented in X and Y directions. A 96 KHz alternating current voltage is induced in the X and Y conductors by the pen coil and a differential amplifier is connected to the top and the bottom of a single coil through multiplexers.

In U.S. Pat. No. 4,477,877, issued Oct. 15, 1984, entitled "Coordinate Determining Device" to Nakamura et al. there is described a coordinate determining device that includes means for compensating for an error of a computed position that is caused by an inclination of a coordinate indicator relative to a tablet. This technique uses detected secondary peak voltage values within sensing lines that are remote from a sensing line having a maximum voltage value.

U.S. Pat. No. 4,552,991, issued Nov. 12, 1985, entitled "Absolute Position Coordinate Determining Device Employing a Single Phase Difference Measurement to Determine Cursor Position" to Hulls there is described a two dimensional digitizing system that includes at least two conducting grid systems. Each grid system has a number of windings with a first pitch distance and an equal number of windings with a second pitch distance that differs from the first pitch distance by a small increment. This technique is said to enable both coarse and fine position measurements.

In U.S. Pat. No. 4,717,793 issued Jan. 5, 1988, entitled "Graphic Input Device" to Kobayashi there is described a graphic input device having envelope detection that accommodates a range of stylus or pen inclinations. FIG. 13B illustrates how the tilting of a pen causes an intense magnetic field to interlink those conductor loops toward which the pen is tilted. As a result, a significant peak is said to appear in a signal, as shown in FIG. 15B.

In U.S. Pat. No. 4,928,256, issued May 22, 1990, entitled "Digitizer for Position Sensing", to Parnell et al. there is described apparatus and method for determining the position, tilt, and offset of a pointer with respect to a grid of parallel conductors. This method involves storing information that is functionally related to a characteristic shape of a response curve, and mathematically fitting measured responses to a functional expression that represents the stored characteristic shape so as to determine the positional coordinates of the pointer.

In U.S. Pat. No. 4,939,318, issued Jul. 3, 1990, entitled "Digitizer Pen Tilt Correction Employing Wires Near the Data Point" to Watson et al. there is described a digitizer tablet system that employs a method of compensating a calculation of a position of a pen tip. The method includes calculating an approximation to the pen tilt and adding a preestablished constant that is multiplied by the tilt.

In U.S. Pat. No. 4,990,726, issued Feb. 5, 1991, entitled "Digitized Controller for Position Locator" to Lasley there is described a digitizer tablet that determines a pair of sample values from wires located under opposite sides of a pointing device and interpolates between the pair of sampled values to determine the location of the pointing device.

What is not taught by this prior art, and what is thus an object of the invention to provide, is an estimator of both pen position and tilt that employs weighted coil signal measurements.

A further object of the invention is to provide an estimator of both pen position and tilt that employs coil signal measurements that are weighted in accordance with a gaussian weighting function.

SUMMARY OF THE INVENTION

The foregoing and other problems are overcome and the objects of the invention are realized by a digitizer tablet having an array of conductors that define a sensing plane for sensing an electromagnetic signal generated by a pointing device disposed external to the plane. The tablet includes circuitry, coupled to the array of conductors, for determining a magnitude of an electrical signal or signals induced within the array of conductors by the pointing device. The tablet also includes, in one embodiment of the invention, a data processor that is responsive to the determined magnitude for accurately estimating both a position and an angular orientation of the pointing device relative to a coordinate system associated with the sensing plane.

Further in accordance with the invention there is described a method of operating a digitizer tablet, and apparatus for accomplishing the method, to determine a location of a pen or stylus. A first step measures an electrical signal induced within each of a plurality of sensor grid coils by a proximity of the pen to the plurality of sensor grid coils. A next step determines a pair of adjacent coils where the induced electrical signal goes through a zero crossing. A third step derives a first position estimate of the location of the pen relative to the plurality of sensor grid coils. A fourth step centers a first weighting curve on the first position estimate, and a fifth step employs a least squares line fit, using weighted measurements of the electrical signals, to derive a second position estimate of the location of the pen relative to the plurality of sensor grid coils.

A further step determines an angular orientation of the pen to a plane of the sensor grid coils by the steps of (a) centering a second weighting curve on the second position estimate; (b) calculating a weighted average of the signal measurements; and (c) normalizing the weighted average of the signals against the RMS average of the signal strengths.

The method also derives an x-axis and a y-axis position correction from the determined pen orientation.

BRIEF DESCRIPTION OF THE DRAWING

The above set forth and other features of the invention are made more apparent in the ensuing Detailed Description of the Invention when read in conjunction with the attached Drawing, wherein:

FIG. 3a illustrates an embodiment of a weighting curve (D) for performing a tilt estimation;

FIGS. 3b–3j depict a sensor grid array and coil measurements obtained therefrom, and further illustrates embodiments of weighting curves for pen position and tilt estimations accomplished in accordance with the invention;

DETAILED DESCRIPTION OF THE INVENTION

Figure 1:
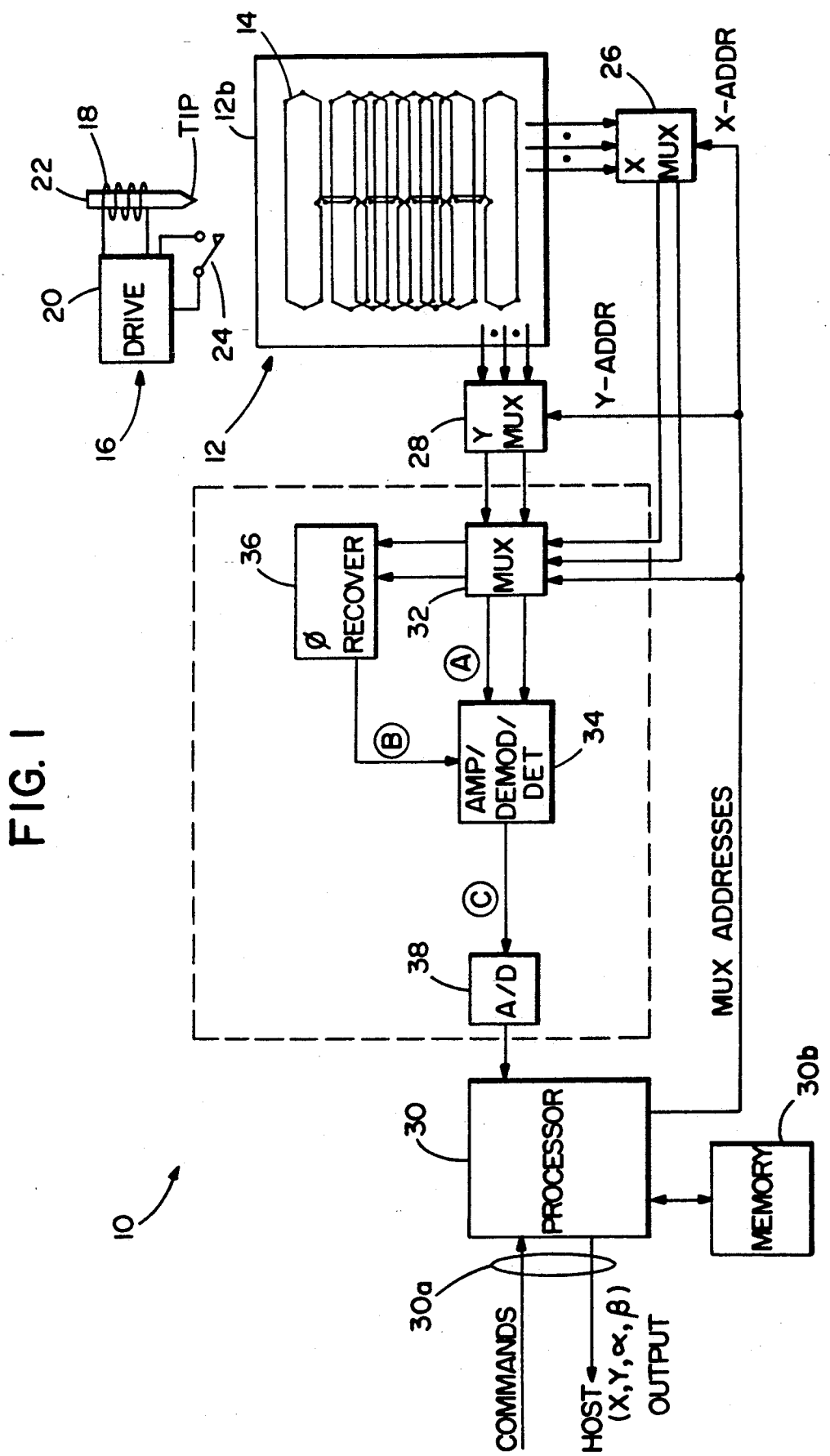
FIG. 1 is a block diagram of a digitizer tablet that is constructed and operated in accordance with the invention.

Referring to FIG. 1 there is shown in block diagram form a digitizer tablet 10. Tablet 10 includes a sensor grid 12 comprised of two superimposed coil arrays 14, the coils of one array 14 being orthogonally disposed relative to the coils of the other array. During use, a pen 16 generates an electromagnetic signal that is sensed by the sensor grid 12.

Individual coils of each array may be differentially connected together to form overlapping coil pairs, in a manner described in U.S. patent application Ser. No. 07/696,435, filed on even date herewith, entitled "Senor Grid for an Electromagnetic Digitizer Tablet", by Gregory Russell, now U.S. Pat. No. 5,136,125, issued on Aug. 4, 1992. It should be noted, however, that the teaching of the invention is applicable to a number of sensor grid geometries.

The pen 16 includes an inductive coil 18 and a coil drive circuit 20. Coil 18 is typically wrapped around a ferrite core 22. A contact switch 24 is normally employed for indicating when the tip of the pen 16 contacts an upper surface of the sensor grid 12. For an untethered type of probe the drive circuit 20 may also include means for encoding the switch open/closed information for transmitting this information for reception by the sensor grid 12.

By example, the inductance of each coil pair within the sensor grid 12 is approximately 0.1 to approximately 1.0 microhenries, for a coil that is one centimeter in width and approximately 20 centimeters in length, and the inductance of the pen coil 18 is approximately 100 to approximately 200 microhenries.

Figure 2:
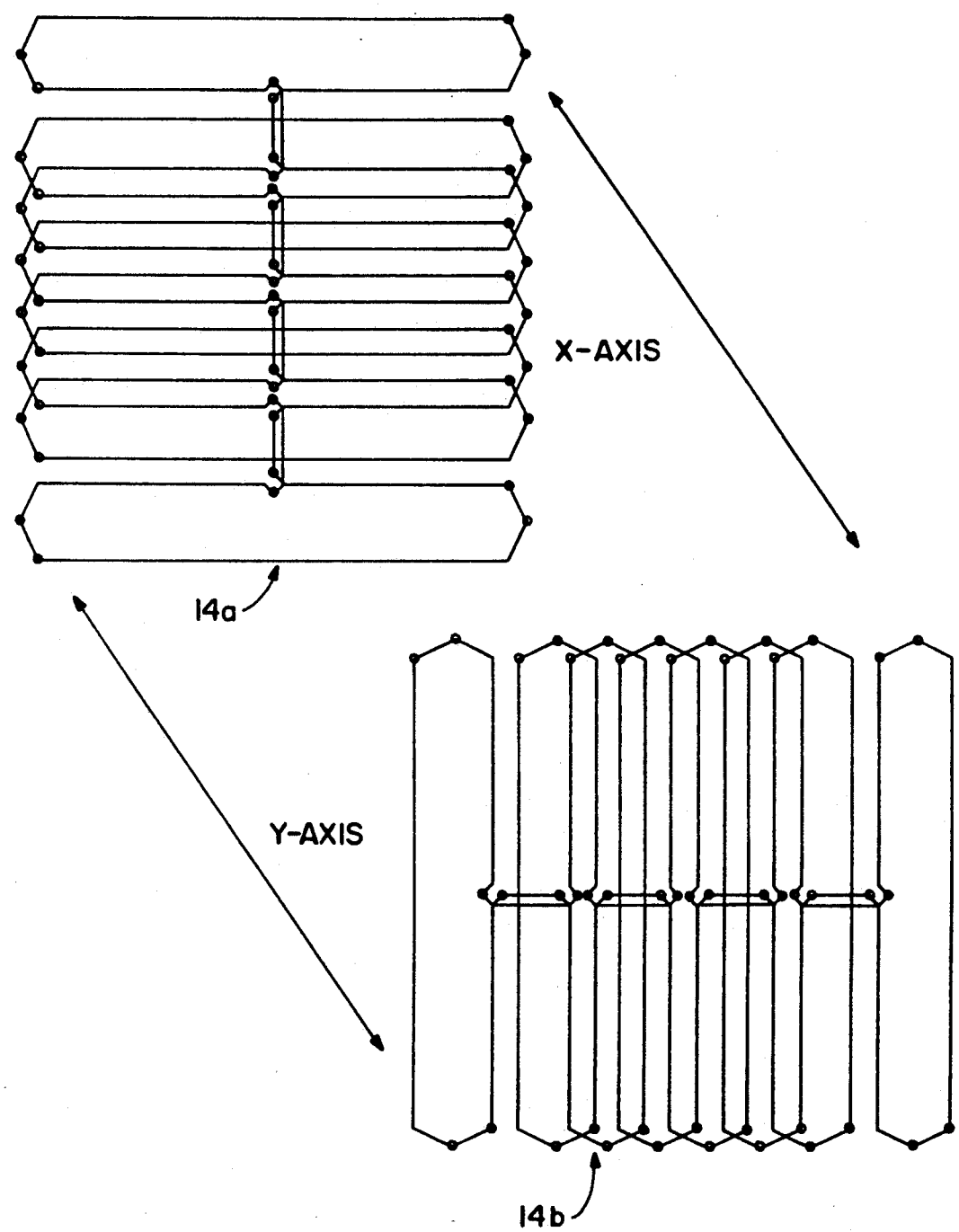
FIG. 2 illustrates a sensor grid comprised of two sets of overlapping, differentially connected coil pairs, the coil pairs of one set being orthogonally disposed relative to the coil pairs of the other set.

FIG. 2 illustrates the orthogonal orientation of an x-axis sensor array 14a relative to a y-axis sensor array 14b within the sensor grid 12. Each of the sensor arrays 14 may be identical in construction. The overlap between adjacent coil pairs is not required, but is preferred in that received signal strength is increased because individual coils may be made wider, while maintaining the same coil pitch, or center-to-center spacing, between adjacent coils.

Tablet 10 further includes an x-axis multiplexer 26 and a y-axis multiplexer 28 that receive inputs from coil pairs of the x-axis sensor array 14a and the y-axis sensor array 14b, respectively. The coil pairs may be directly coupled to the inputs of the multiplexers 26 and 28 or they may be coupled through impedance matching transformers. A particular coil pair is selected by means of a Y address signal (YADDR) and a second coil pair by means of an X address signal (XADDR), both of which are generated by a processor 30. The signal outputs from the selected y-axis coil pair and the selected x-axis coil pair are provided to a multiplexer 32. If the processor 30 is selecting one of the x-axis coil pair signals to be provided to an amplifier/demodulator/detector (ADD) block 34, a y-axis coil pair signal is selected and provided to a clock phase recovery circuit 36. Conversely, if the processor 30 is selecting one of the y-axis coil pair signals to be provided to the ADD block 34; an x-axis coil pair signal is selected and provided to the phase recovery circuit 36. The phase recovery circuit 36 includes a phase-locked loop and generates a coherent detection clock (B).

Figure 5A:
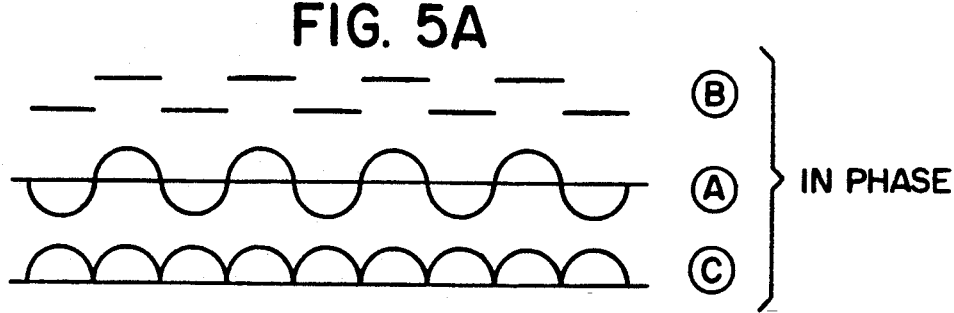
FIG. 5a shows signals that correspond to outputs of certain of the blocks of FIG. 1, and specifically shows an in-phase relationship of a coherent detection clock with respect to a signal received from the sensor grid.
Figure 5B:
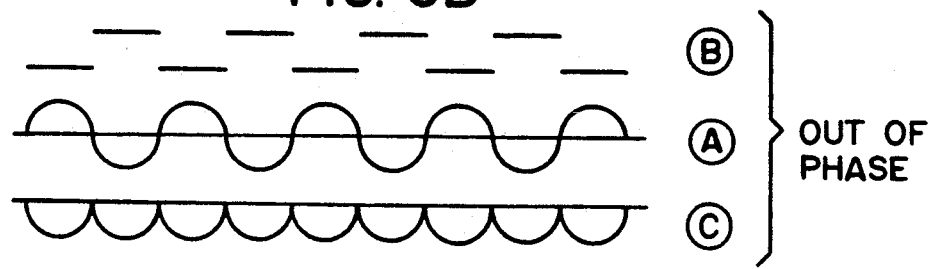
FIG. 5b illustrates signals corresponding to an out-of-phase relationship of the coherent detection clock with respect to the signal received from the sensor grid.

Referring to FIGS. 5a and 5b, the signal designated (A) in FIG. 1 is the input to the ADD 34 from the multiplexer 32. As was previously stated, this signal is an AC signal. Phase recovery circuit 36 generates a square wave signal which is the coherent detection clock (B). When the coherent detection clock is low, the corresponding portion of the A signal is inverted at the output of the ADD 34. When the coherent detection clock is in phase with the signal (A), the output signal (C) resembles a positive full-wave rectified signal as shown in FIG. 5a. When the coherent detection clock out of phase with the signal A, as shown in FIG. 5b, the output (C) resembles a negative full-wave rectified signal. The use of the coherent detection clock enables, for a differential grid embodiment, a determination if coil signal is in phase (+) or out of phase (−) with other coil signal measurements. This also facilitates the calculation of tilt, as will be made more apparent below.

The signal (C) is applied to an integrating analog-to-digital (A/D) converter 38 where the magnitude and sign of the signal is converted to a digital format for inputting to the processor 30.

More specifically, the coil signal strength is represented as a signed value proportional to the amplitude of the AC voltage induced in the coil grid 12 by the pen coil 18. The signal strength has a positive sign if the induced voltage is in phase with the pen coil 18 voltage, or a negative sign if the induced voltage is out of phase with the pen coil 18 voltage.

During use, the processor 30 sequentially scans a plurality of adjacent coil pairs and measures the induced signal strengths in each coil pair. These measurements are operated upon by novel signal processing algorithms, described in detail below, to arrive at an estimated pen position and pen tilt.

The processor 30 is connected to an external host by a communication line 30a, such as a conventional RS-232C serial communication line, and receives commands and set up information from the host. The processor 30 is coupled to a memory 30b that contains a stored program for executing a method in accordance with Eqs. 1–12, described below, and in accordance with the flowchart of FIG. 4. During operation the processor 30 outputs packets of information relating to the position and, if required, angular orientation of the pen 16 relative to the sensor grid 12. This information includes x-axis and y-axis pen position information and tilt information (alpha and beta) regarding the orientation of the pen relative to a sensor grid 12 x-y coordinate system. During use, processor 30 may output several hundred pen position and orientation information packets per second. As such, the provision of efficient measurement and computation techniques are important concerns.

In determining an estimate of the pen 16 position, relative to the sensor grid 12 x-y coordinate system, the invention provides improved position estimation techniques. The invention also provides a technique for estimating the orientation (tilt) of the pen 16 relative to the plane of the sensor grid 12.

Figure 6A:
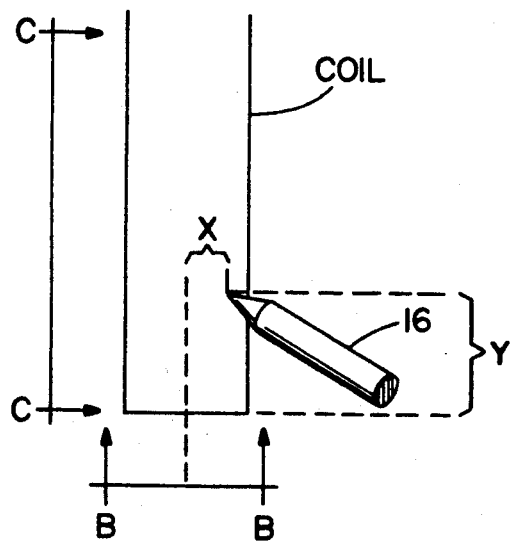
FIGS. 6a–6c are a top view, an end view, and a side view, respectively, of a pen positioned relative to a coil, these Figures specifically showing the components of pen tilt.
Figure 6B:
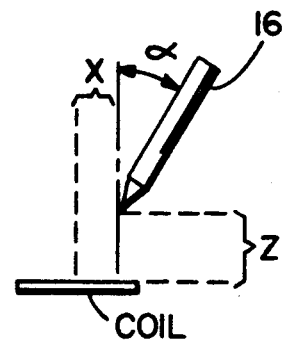
Figure 6C:
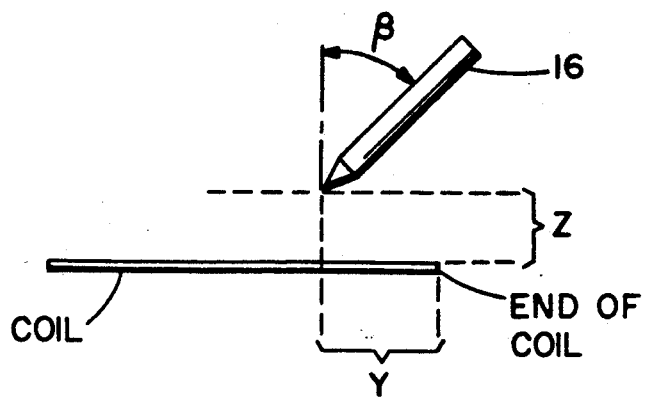

FIGS. 6a–6c are a top view, an end view, and a side view, respectively, of the pen 16 positioned relative to a coil, these Figures specifically showing the components of pen tilt (alpha and beta).

For the signal waveforms of FIGS. 3b–3j a pen coil 18 having a length of 11 millimeters is assumed. Also, it is assumed that the bottom of the pen coil 18 is disposed six millimeters above the tip of the pen 16. It is also assumed that the tip of the pen 16 is disposed upon a writing surface that is spaced eight millimeters from the sensor grid array. The underlying square grid shown in these figures indicates the centers of coils. For the non-differential coil embodiment the coils are assumed to have a width of 0.75 centimeters spaced one centimeter apart (center-to-center) in x and in y. For the differentially connected coil pair embodiment it is assumed that each coil is 0.75 centimeters wide with the coils of a pair being spaced 1.5 centimeters apart (center-to-center), while two adjacent overlapping coil pairs are spaced one centimeter apart (center-to-center).

Figure 3B:
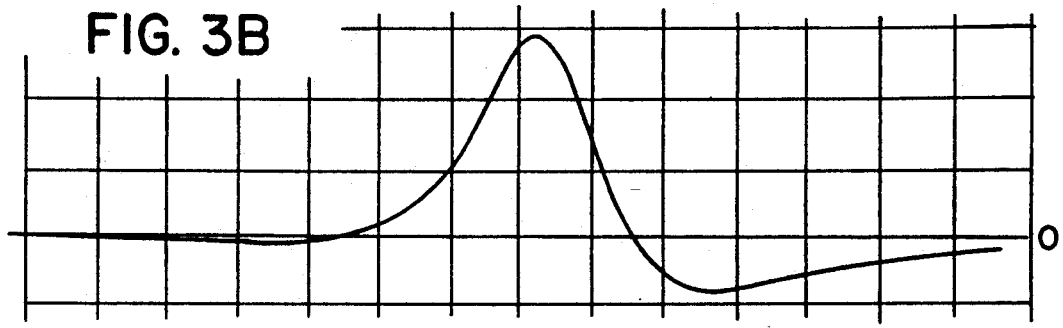

The signal waveforms of FIG. 3b assume y=2 centimeters measured from the end of the coil, z=8 millimeters, alpha=0.6 radians (35°), beta=0, and no magnetic shield 12b.

Figure 3C:
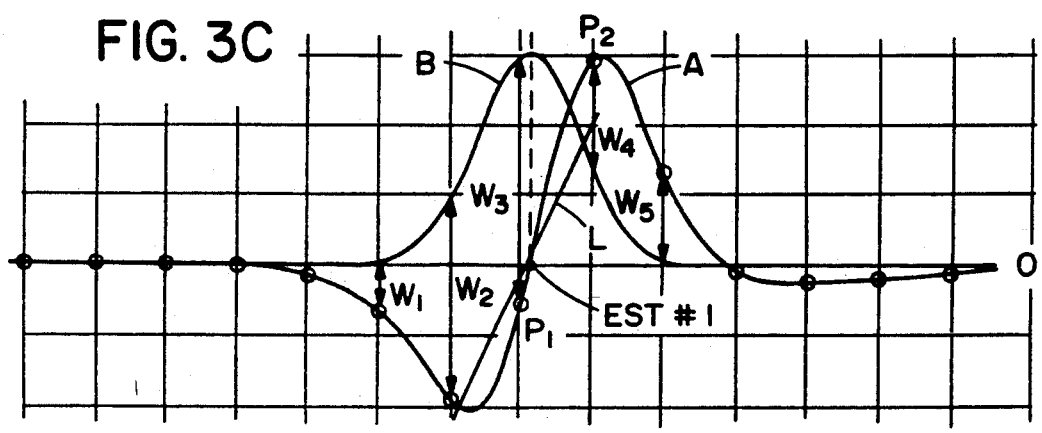
Figure 3D:
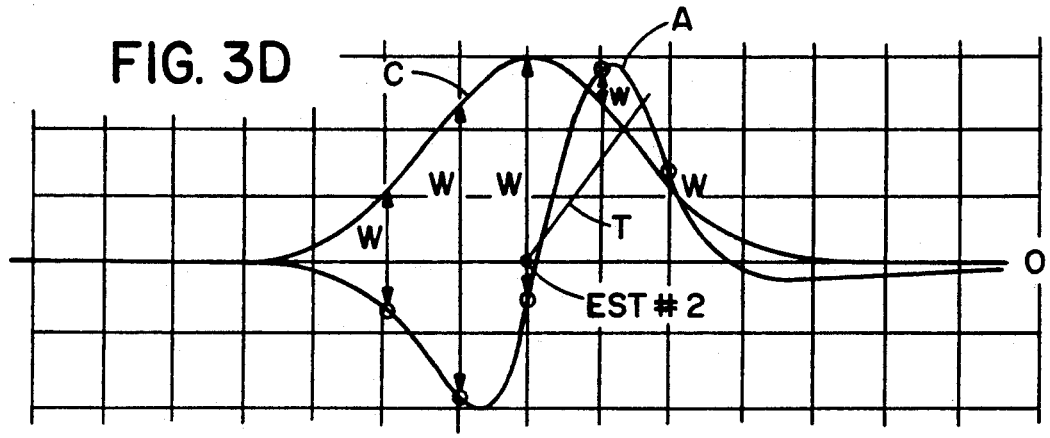

Referring to FIG. 3b, there is shown a signal waveform derived from a non-differential coil, as described above. FIG. 3c shows a signal waveform (A) that is derived from differentially connected coil pairs. The circles indicate discrete coil measurements. In accordance with the invention a first weighting function, depicted as a gaussian curve B, is centered on a first pen position estimate (EST.#1) that is derived from a zero crossing position estimator having a nonlinear correction applied thereto. This first weighting function is employed to weight ($W_1$–$W_5$) the coil signal measurements in providing a least squares line fit, indicated by the line L, of five adjacent discrete coil measurements to derive a second pen position estimate (EST.#2). FIG. 3d shows the waveform signal (A) and a second weighting function, depicted as a gaussian curve C, that is centered EST.#2. Also shown in FIG. 3d is a pen tilt estimation (T) that is derived in accordance with an aspect of the invention, as described below.

FIG. 3e shows the signal waveform obtained from the differentially connected coil pairs, as in FIG. 3c, but with beta equal to 47°. FIG. 3f corresponds to FIG. 3d and shows that the pen tilt estimate (T) diverges from an actual pen tilt (AT).

Figure 3G:
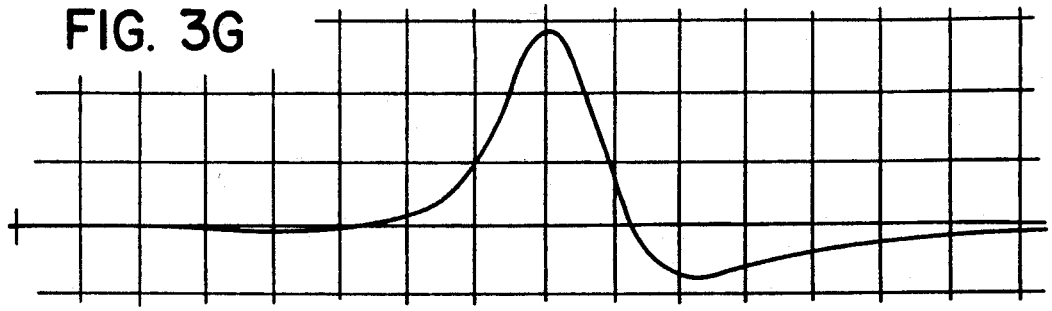
Figure 3H:
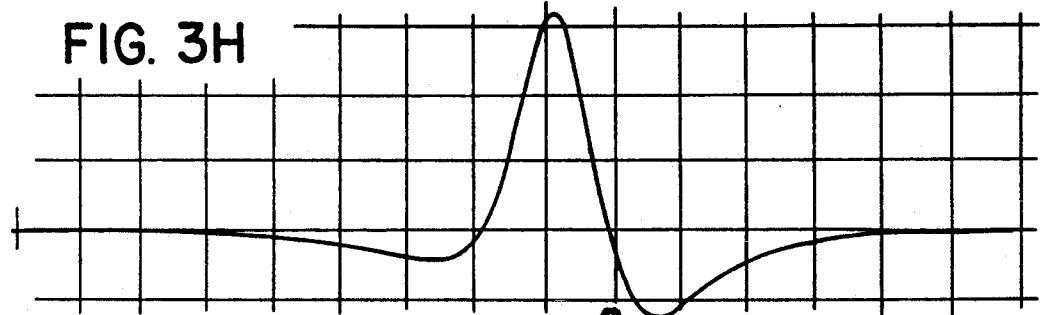
Figure 3I:
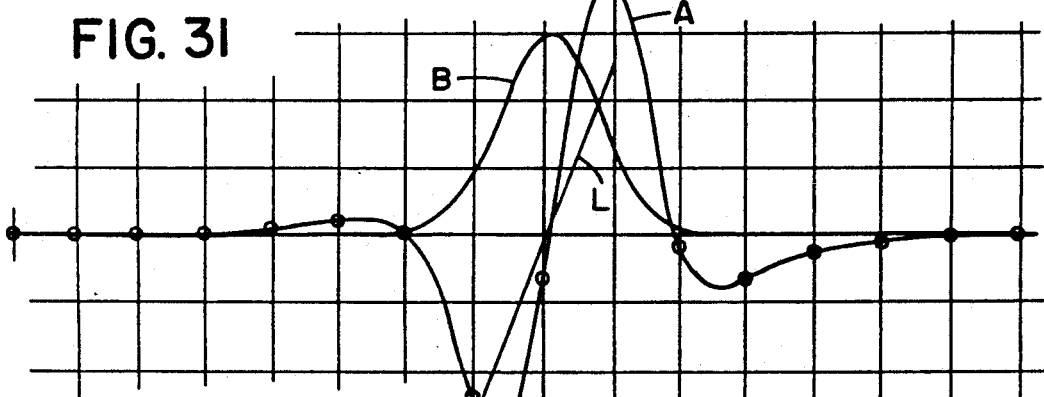
Figure 3J:
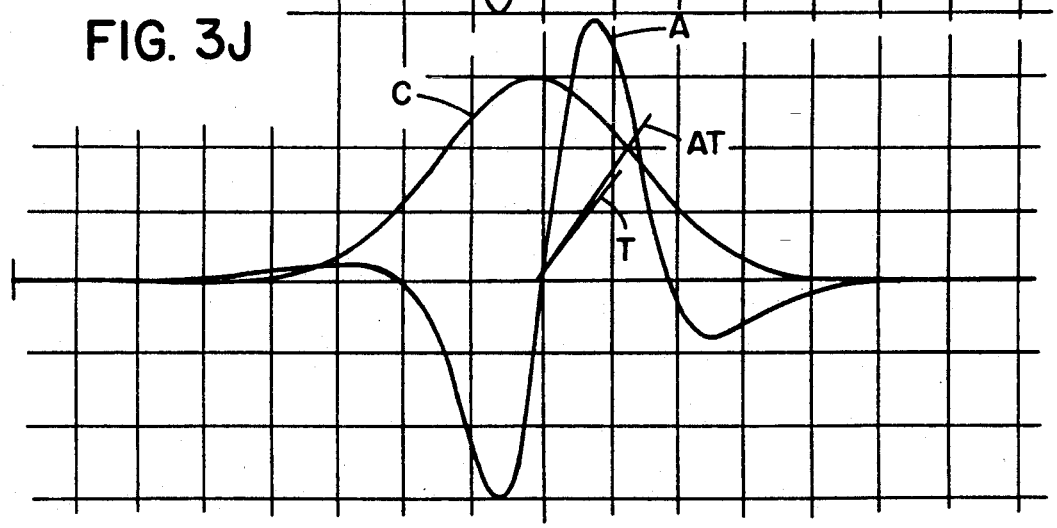

FIG. 3g depicts the waveform signal derived from the non-differential coil for the condition shown in FIG. 3e and FIG. 3f (without the magnetic shield 12b) while FIG. 3h shows, by comparison, the waveform signal derived from the non-differential coils but with a conductive plane used as the magnetic shield 12b, the shield 12b being spaced closely adjacent to the sensor grid array 12a. FIG. 3i and FIG. 3j correspond to FIGS. 3e and 3f, respectively, but with the conductive magnetic shield 12b. As can be seen, due to presence of the shield 12b the signal waveform shape changes. The constants for the estimators described below for pen position and tilt are modified accordingly to compensate for the changes in signal shape.

Figure 4:
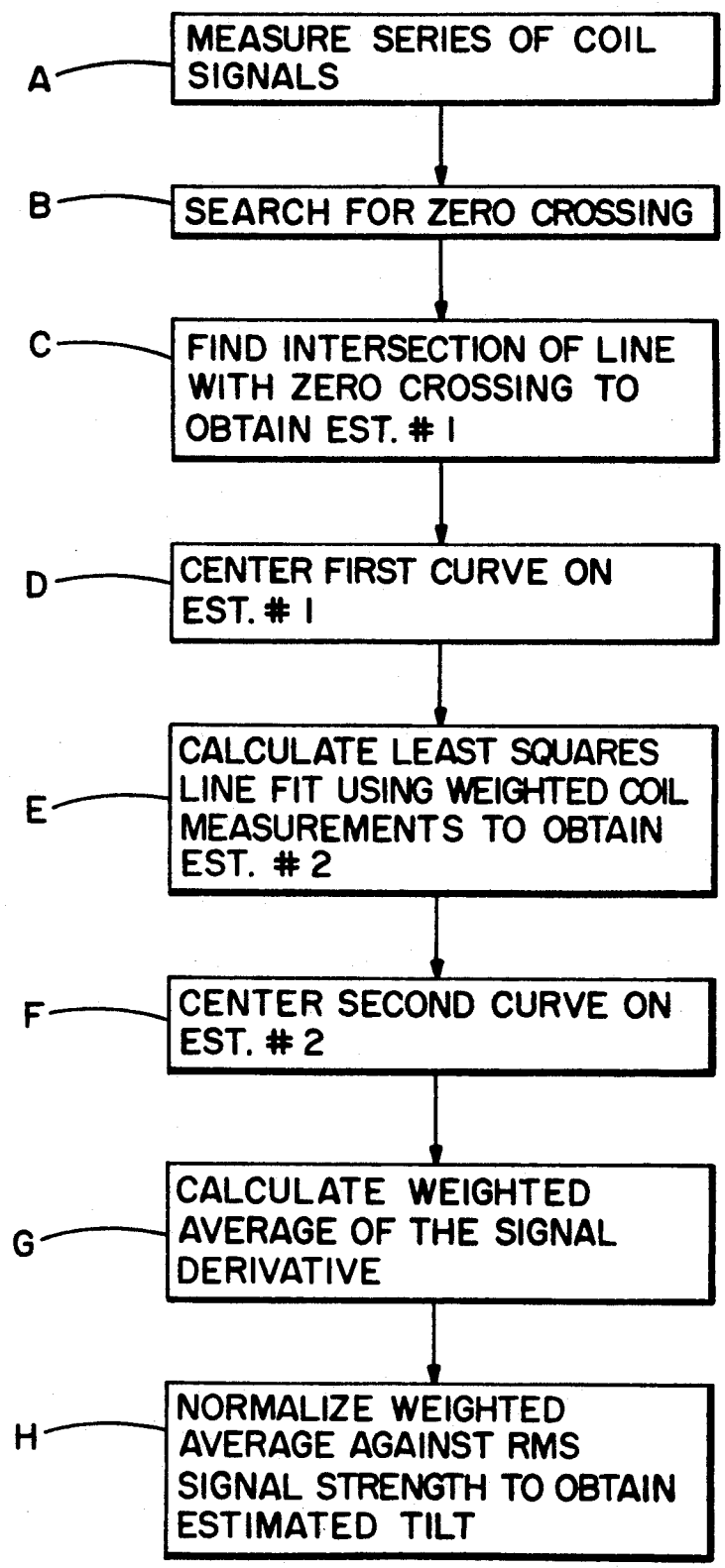
FIG. 4 is a flowchart illustrating the operation of the estimators of FIGS. 3c, 3d, 3e, 3f, 3i, and 3j.

Referring to the flowchart of FIG. 4 at steps A, B and C, a measurement is made of a series of coil signals (step A), afterwhich a search is made for a zero crossing (step B). Thereafter, a first position estimator finds a zero crossing point of a straight line between two adjacent coil pair measurements which (differentially) cross zero (step C). These two points are indicated as P1 and P2 in FIG. 3c. This technique yields the first position estimate (EST.#1), which is a nonlinear function of the actual pen position. This position estimate is strongly influenced by pen tilt (alpha and beta).

More specifically, this first estimator employs only two points (coil signals) and calculates the zero crossing therefrom. There is selected a coil pair, between the minimum and maximum value coil pairs, having a value that is nearest to zero. There is then chosen an adjacent coil pair whose signal is opposite in sign to the coil pair nearest to zero.

A fractional position estimate between coils is expressed as:

$$x = f_s(A/A - B); \quad (1)$$

where A and B are the signal strengths in the left and right adjacent coil pairs. The fraction is measured from the center of the left coil pair.

The function $f_s(\ )$ is a nonlinear correction to compensate for the distortion inherent in the estimator. In practice the correction values are tabulated.

Referring to the flowchart of FIG. 4 at steps D and E, an improved position estimator calculates a least-squares straight line fit based on five or more coil measurements, using the weighting function derived from a symmetrical curve centered upon the EST.#1. In this regard the curve may conform to a gaussian function, as shown in FIG. 3c, or to some other suitable symmetric curve, such as one generated by the expression $(1/(1+(x/w)^2))$, where w is one half of the width of the curve. For the measured signal magnitudes, the first weighting function is centered on the first position estimate (EST.#1) as derived above. An optimum width of the weighting function is related to the coil spacing and pen coil geometry. A curve half-width of one centimeter has been found to be suitable with the pen coil 18 geometry specified for the signals depicted in FIGS. 3b-3j. The zero crossing point of the least squares fit line is used as the second, improved, pen position estimate (EST.#2).

The improved position estimator may be summarized as:

$$X_2 = \bar{x} - \bar{v}/m \quad (2)$$

which is a form of zero crossing equation wherein
$\bar{x}$ = weighted average of coil positions;
$\bar{v}$ = weighted average of induced signal strengths in the coils; and
m = slope estimate derived from the least squares line fit.

These quantities are calculated from five adjacent coil positions in accordance with:

$$\Sigma x = \sum_{i=-2}^{2} x_i \exp\left(-\left(\frac{\Delta x_i}{w}\right)^2\right) \quad (3)$$

which provides a weighted sum of x coil positions;

$$\Sigma v = \sum_{i=-2}^{2} v[i] \exp\left(-\left(\frac{\Delta x_i}{w}\right)^2\right) \quad (4)$$

which provides a weighted sum of signal strengths;

$$\Sigma xx = \sum_{i=-2}^{2} (x_i)^2 \exp\left(-\left(\frac{\Delta x_i}{w}\right)^2\right) \quad (5)$$

which provides an x position autocorrelation;

$$\Sigma xv = \sum_{i=-2}^{2} (x_i)v[i] \exp\left(-\left(\frac{\Delta x_i}{w}\right)^2\right) \quad (6)$$

which provides a position-voltage correlation; and $$n = \sum_{i=-2}^{2} \exp\left(-\left(\frac{\Delta x_i}{w}\right)^2\right) \quad (7)$$

which provides a normalization constant.

The term (w) is the half-width of the gaussian, and delta $(x_i)$ indicates the distance of the $i^{th}$ coil center from EST.#1. Also, $$\bar{x} = \Sigma x/n, \; \bar{v} = \Sigma v/n \quad (8)$$

and the slope (m) of the least squares line fit is given by $$m = \frac{\Sigma xv - n\bar{x}\bar{v}}{\Sigma xx - n\bar{x}\bar{x}} \quad (9)$$

As was stated, these equations represent a least squares fit to a straight line using weighted points corresponding to adjacent coil measurements.

The resulting estimator $(X_2)$ is substantially linear, and requires little or no correction. Furthermore, this improved estimator may be employed with a number of different types of coil geometries and is not restricted for use only with differentially connected coil pairs.

The most significant remaining distortion is a function of X, alpha, and beta. For a pen tilt of up to 55° from vertical, the distortion is typically less than ±6% of the coil spacing. This distortion can be readily corrected using interpolation on tabulated values of X, alpha and beta to yield a residual error of ±1.5% of the coil spacing near the tilt extremes with less than 0.5% coil spacing error for tilts less than 30°. The determination of alpha and beta values to be used in the interpolation is described below.

In accordance with a further aspect of the invention reference is now made to FIG. 3d, and the flowchart of FIG. 4 at steps F, G, and H, for illustrating an estimator that provides an estimate of pen tilt (alpha and beta). The estimated tilt may be employed to determine a compensation for the pen estimate (EST.#2) and may also be output to the host system. The tilt estimator also employs a weighted estimate, based upon the curve C. Curve C is centered on the position estimate EST.#2 and has an approximate half-width of two centimeters. The method calculates a weighted average of the signal derivative in the vicinity of the pen 16, the weighted average being normalized against the RMS signal strength to provide a preliminary estimate of the tilt angle in the dimension from which the signal strengths are obtained.

More specifically, given an initial position estimate, the estimator for the pen tilt angles calculates a weighted sum of the coil signals, with the curve being centered on the position estimate EST.#2, and normalizes the result by the average coil power. Using a gaussian weighting function, the tilt estimator is given by the expression:

$$\text{tilt} = K \frac{\sum_{i=1}^{N} \exp\left(-\left(\frac{x_i - x_0}{w}\right)^2\right) V(i)}{\sqrt{\sum_{i=1}^{N} V^2(i)}} \quad (10)$$

where $x_i$ is the position of the $i^{th}$ coil, $x_0$ = position estimate, W = width of the curve, V(i) = the signal in the $i^{th}$ coil, K is a proportionality constant, and where tilt is expressed in radians or degrees.

FIG. 3a illustrates a further embodiment of a weighting curve (D) for performing the tilt estimation as described above. Curve D is symmetrically disposed about the position estimate EST.#2 and has an approximate half-width of two centimeters. Curve D is generally saddle-shaped and has a concave central portion, with the minimum amplitude of the concave central portion being centered on EST.#2.

As can be seen in FIGS. 6a, 6b and 6c the tilt angles, alpha and beta, are measured from two-dimensional projections of the pen 16 onto the y-z and x-z planes, respectively. Alpha is the angle between the vertical and the projection of the pen 16 onto a plane orthogonal to the Y axis. Beta is the angle between the vertical and the projection of the pen 16 onto a plane orthogonal to the X axis.

The orientation of the pen 16 may also be specified by the cartesian distances from the point to the opposite end, namely dx, dy, and dz. These are related to the tilt angles by the equations:

$$\tan(alpha) = dx/dz, \ \tan(beta) = dy/dz \quad (50)$$

The tilt angle estimator described in Eq. 10 is improved by a correction for changes in pen position. The first estimator (Eq. 1) or second estimator (Eq. 2) may be used effectively for this purpose. The correction appears in the proportionality constant (K) which becomes a function of a fractional pen location between coils.

The position and pen tilt estimators described above are for estimating the pen position and tilt in the x-dimension. Having arrived at these estimates the same procedure is followed by the processor 30 for deriving the pen position and tilt in the y-dimension.

The remaining error in the tilt estimator is less than 0.04 radians over all angles up to 55° (0.9 rad) from the vertical, and for all pen tip locations on the surface of the sensor grid 12. Larger errors occur for pen tip positions above the surface.

Further in accordance with the invention the estimated pen tilt values are employed as correction factors for the pen position estimates. The x-dimension correction factor is approximately:

$$\Delta x = k \sin \alpha (\cos \beta - c) \quad (11)$$

and the y-dimension correction factor is approximately:

$$\Delta y = k \sin \beta (\cos \alpha - c) \quad (12)$$

where the proportionality constant (k) and the offset (c) are related to the pen coil 18 geometry and the height of the pen coil 18 above the sensor grid 12.

Although described in the context of a digitizer tablet that employs coil arrays to sense a magnetic field generated by a pen it should be realized that the teaching of the invention also applies to digitizer tablets that drive the coil arrays and sense a magnetic field with a pen coil. The teaching of the invention also applies to digitizer tablets that sense electric fields instead of magnetic fields.

Thus, while the invention has been particularly shown and described with respect to presently preferred embodiments thereof, it will be understood by those skilled in the art that changes in form and details may be made therein without departing from the scope and spirit of the invention.

Having thus described my invention, what I claim as new, and desire to secure by Letters Patent is:

1. A digitizer tablet comprising a fixed array of inductors for use with an external moveable inductor and including means for determining a magnitude of a mutual inductance between the array of inductors and the moveable inductor, the digitizer tablet further including means, coupled to an output of the determining means and responsive to the determined magnitude, for deriving an estimate of the position of the moveable inductor relative to a coordinate system associated with the fixed array of inductors, wherein the determining means includes measurement means for measuring a magnitude of an induced electrical signal from individual ones of the fixed array of inductors, and wherein the estimating means includes means for weighting a plurality of the measurements in accordance with a first weighting function for determining an estimated position of the moveable inductor in accordance with a least squares line fit of the plurality of weighted measurements.

2. A digitizer tablet as set forth in claim 1 and further including means for applying a second weighting function to the plurality of measurements for obtaining an estimate of the angular orientation of the moveable inductor with respect to a plane that contains the fixed array of inductors, wherein the second weighting function is centered on the estimated position.

3. A method of operating a digitizer tablet to determine a location of a pointing means relative to a surface of the tablet, the method comprising, for each dimension x and y, the steps of:
  determining a first position estimate of a location of the pointing means relative to a plurality of sensor grid coils disposed beneath the surface of the tablet;
  centering a first curve representing a first weighting function on the first position estimate;
  weighting a plurality of electrical signal measurements of adjacent coils in accordance with the first weighting function; and employing a least squares line fit, using the weighted measurements, to derive a second position estimate of the location of the pointing means relative to the plurality of sensor grid coils.

4. A method as set forth in claim 3 wherein the least squares line fit is accomplished in accordance with the expression:

$$X_2 = \bar{x} - \bar{v}/m$$

wherein:

$$\Sigma x = \sum_{i=-2}^{2} x_i \exp\left(-\left(\frac{\Delta x_i}{w}\right)^2\right)$$

which provides a weighted sum of x coil positions;

$$\Sigma v = \sum_{i=-2}^{2} v[i] \exp\left(-\left(\frac{\Delta x_i}{w}\right)^2\right)$$

which provides a weighted sum of signal strengths;

$$\Sigma xx = \sum_{i=-2}^{2} (x_i)^2 \exp\left(-\left(\frac{\Delta x_i}{w}\right)^2\right)$$

which provides an x position autocorrelation;

$$\Sigma xv = \sum_{i=-2}^{2} (x_i)v[i] \exp\left(-\left(\frac{\Delta x_i}{w}\right)^2\right)$$

which provides a position-voltage correlation; and $$n = \sum_{i=-2}^{2} \exp\left(-\left(\frac{\Delta x_i}{w}\right)^2\right)$$

which provides a normalization constant; and wherein (w) is the half-width of the weighting function, delta ($x_i$) indicates the distance of the $i^{th}$ coil center from the first position estimate, $$\bar{x} = \Sigma x/n, \; \bar{v} = \Sigma v/n$$

and the slope (m) of the least squares line fit is given by $$m = \frac{\Sigma xv - n\bar{x}\bar{v}}{\Sigma xx - n\bar{x}\bar{x}}.$$

5. A method as set forth in claim 3 wherein the first curve has a half-width that is approximately one centimeter.

6. A method as set forth in claim 3 and including the initial steps of:
measuring an electrical signal induced within individual ones of the plurality of sensor grid coils by a proximity of the pointing means to the plurality of sensor coils; and
identifying a pair of adjacent sensor grid coils where the induced electrical signal goes through a zero crossing; wherein
the step of determining the first position estimate of the location of the pointing means relative to the plurality of sensor grid coils is based on the identified zero crossing.

7. A method as set forth in claim 6 wherein the step of determining the first position estimate includes a step of determining a fractional position estimate (x) between two adjacent coils in accordance with the expression:

$$x = f_x(A/A - B);$$

where A and B are signal strength measured in two adjacent coils.

8. A method as set forth in claim 3 and further comprising a step of determining an estimate of an angular orientation of the pointing means to a plane of the sensor grid coils by the steps of:
centering a second curve representing a second weighting function on the second position estimate;
calculating a weighted average of the plurality of electrical signal measurements; and
normalizing the weighted average of the electrical signal measurments against a RMS electrical signal strength of the electrical signal measurements.

9. A method as set forth in claim 4 and further including a step of selectively applying a correction factor to one of the first position estimate and the second position estimate, the correction factor being based on the determined estimate of the angular orientation.

10. A method as set forth in claim 8 and including a step of outputting the determined angular orientation to means disposed external to the digitizer tablet.

11. A method as set forth in claim 8 wherein the second curve has a half-width that is approximately two centimeters.

12. A method as set forth in claim 4 wherein the first curve and the second curve are each a symmetrical curve.

13. A method as set forth in claim 4 wherein the first curve and the second curve conform to a gaussian function.

14. A method as set forth in claim 4 wherein the first curve and the second curve conform to a curve generated by the expression $(1/(1+(x/w)^2))$, where w is one half of the width of the curve.

15. A method as set forth in claim 4 wherein the second curve has a concave central portion, and wherein a minimum amplitude of the concave portion is centered on the second position estimate.

16. A method as set forth in claim 8 wherein the step of determining the angular orientation is accomplished in accordance with the expression:

$$\text{tilt} = K \frac{\sum_{i=1}^{N} \exp\left(-\left(\frac{x_i - x_0}{w}\right)^2\right) V(i)}{\sqrt{\sum_{i=1}^{N} V^2(i)}}$$

where $x_i$ is the position of the $i^{th}$ coil, $x_0$ = position estimate, W = width of the curve, V(i) = the signal in the $i^{th}$ coil, K is a proportionality constant.

17. A method as set forth in claim 16 and further comprising the steps of determining an x-dimension estimated position correction factor in accordance with $$\Delta x = k \sin \alpha (\cos \beta - c)$$

and determining a y-dimension estimated position correction factor in accordance with $$\Delta y = k \sin \beta (\cos \alpha - c)$$

where alpha is the tilt angle between vertical and a projection of the pointing means onto a plane orthogonal to the y-axis, where beta is the tilt angle between vertical and a projection of the pointing means onto a plane orthogonal to the y-axis, where k is a proportionality constant related to coil spacing, and where c is a constant related to a height of the pointing means above the coils.

* * * * *